Dec. 19, 1939.  J. A. TONER  2,183,701
TOE PROTECTOR
Filed June 25, 1938
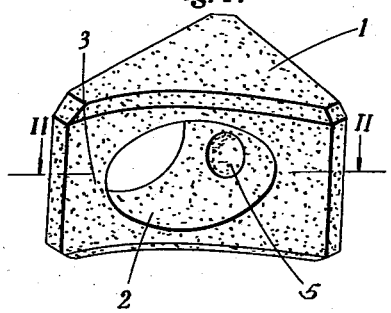
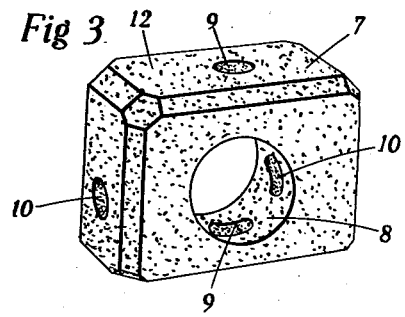
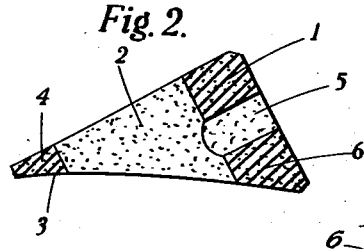
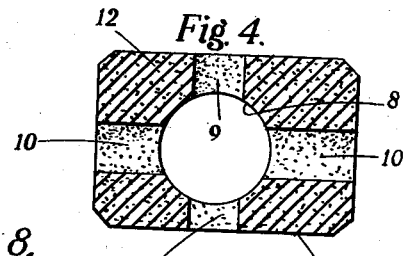
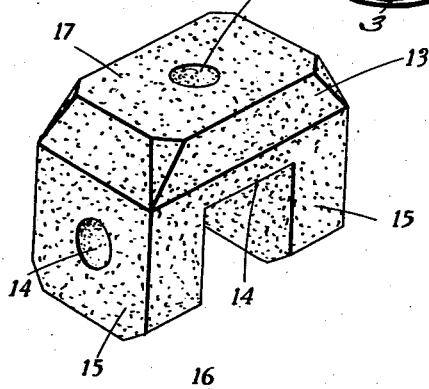
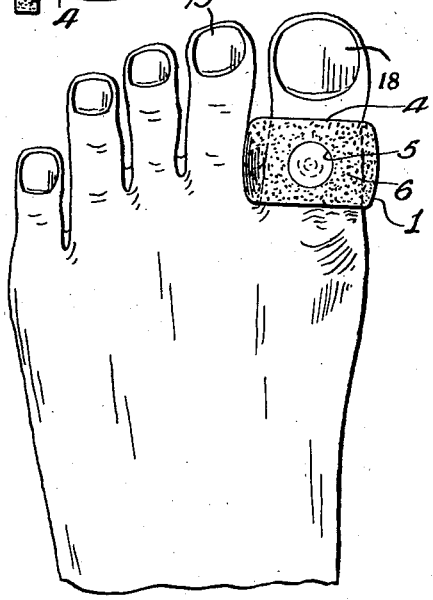
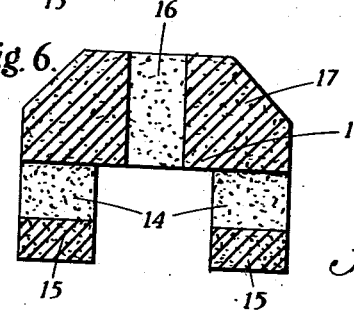
INVENTOR
John Aloyisius Toner,
BY
John B. Brady
ATTORNEY Patented Dec. 19, 1939

2,183,701

UNITED STATES PATENT OFFICE 2,183,701

TOE PROTECTOR

John Aloysius Toner, London, England

Application June 25, 1938, Serial No. 215,895
In Great Britain July 7, 1937

6 Claims. (Cl. 128—153)

This invention relates to devices for the protection of the toes and toe joints from the friction of the shoe, and particularly for the protection of toes having corns or bunions or the like, and hammer toes.

I am aware that many proposals have been made to afford protection to the toes by pads of different soft or resilient materials, including sponge rubber, attachable to the toes as by adhesive tapes or by loops of elastic or inelastic material.

An object of the present invention is to provide a novel, improved, hygienic and cheaper friction preventer for protecting the toes which has the advantages of being easily applicable to suit a variety of foot conditions, washable, and removable for washing or treatment of the feet and replaceable thereafter without impairment of its protective qualities.

Accordingly, I provide a friction preventer for the protection of the toes and toe joints consisting of a block of soft resilient material, preferably spongy or porous rubber, having at least one aperture extending completely between two opposite surfaces for the insertion therein of the toe, and at least one aperture extending radially from the first mentioned aperture and locatable over a corn, an affected joint or the like so that the block bears on the toe about said corn or joint, which is thereby entirely relieved of pressure.

In a friction preventer according to the preceding paragraph, at least two mutually perpendicular apertures extending each between two opposite surfaces of the block may be of different diameters for the purpose of enabling the block to be applied with equal facility to any of the toes by selection of an aperture of appropriate size in which to insert the toe, the other aperture or one of the other apertures being locatable to relieve a corn or affected joint from pressure.

The soft resilient block which constitutes a friction preventer according to the invention may have any one of a variety of external forms.

It may, for example, be in the form substantially of a right-angled triangular prism, with an aperture extending perpendicularly from one of the mutually perpendicular surfaces to the oblique surface, and a second aperture extending radially from the first aperture to the other of the mutually perpendicular surfaces. This form is advantageously applicable for the protection of the second joint of a toe when such joint has a corn or other affection, the toe being inserted so that the perimeter of the oblique surface lies upon the web or webs of the foot between the affected toe and the adjacent toe or toes.

The block may alternatively be cuboidal or spheroidal, with two or three mutually perpendicular apertures penetrating it from side to side.

In either of the aforesaid forms, any or all of the apertures may be effected nearer to one of the parallel surfaces than the other, for the purpose of enabling a greater or less thickness of the resilient material to be located between the affected toe and an adjacent toe or the shoe, as may be desirable for comfort in wear.

As a development of such provision of thinner and thicker walls, one of the walls may be partly eliminated. For example, for the protection of hammer toes I may provide an arched or inverted U-section block having coaxial apertures extending through the lateral portions for the reception of the toe and a perpendicular aperture through the middle or crown portion to enable said portion to bear on the toe about the affected joint while relieving the joint itself of pressure.

By way of example only, and without limitation, the aforesaid particular forms will be described in greater detail, so that the invention may be clearly comprehended, with reference to the accompanying drawing, wherein Fig. 1 is a perspective view of one embodiment, Fig. 2 is a horizontal section through the embodiment as shown in Fig. 1, Fig. 3 is a perspective view of another embodiment, Fig. 4 is a vertical section of the embodiment as shown in Fig. 3, Fig. 5 is a perspective view of an embodiment intended for the protection of hammer toes, Fig. 6 is a vertical section of the embodiment as shown in Fig. 5, Fig. 7 is a plan view of the embodiment according to Figs. 1 and 2, applied to the great toe, and Fig. 8 is a side view of the same, partly broken away.

The friction preventer as shown in Figs. 1 and 2 is constituted by a block or body 1 of spongy or porous rubber in the form of a right-angled triangular prism. A circular aperture 2 extends from the oblique surface 3 of the block to the opposite surface 4, so that its axis is substantially perpendicular to the latter surface. Another circular aperture 5 extends radially from the aperture 2 to the surface 6. The apertures 2 and 5 are of different diameters. The edges of the block and its corners are preferably relieved by chamfering as shown, or otherwise rounded so that the block presents a smooth exterior.

The device as described is applicable to prevent the rubbing of a corn by the shoe by inserting the toe in either the aperture 2 or the aperture 5, whichever is of more convenient size, so that the other aperture is located over and about the corn to prevent the application of pressure thereon. Advantageously the device may be used for the protection of a corn on the second joint of a toe, as it is shown in Figs. 7 and 8, applied to the great toe 18 which is inserted in the aperture 2, the device being adjusted so that the aperture 5 receives a corn on said second joint and one side of the oblique surface 3 comes into contact with the oblique web of the foot between the toe 18 to be protected and the adjacent toe 19. It is also useful for protecting a corn on the outer side of the second joint of the great toe or the little toe, if disposed on the toe so that the aperture other than that in which the toe is inserted is located over such corn.

Figs. 3 and 4 show another friction preventer which consists of a block 7 of spongy or porous rubber of substantially cuboid form. The block has three mutually perpendicular apertures 8, 9 and 10, of different sizes, penetrating it between opposite pairs of sides. The edges and corners of the block are bevelled as shown, but they may be rounded, and it will be evident that the rounding may be so extensive that the block approaches or attains an ovoid or spheroid form.

A friction preventer as shown in Figs. 3 and 4 is applicable to any of the toes for protecting corns thereon particularly on their first joints, the toe being inserted in that one of the apertures 8, 9 or 10 which is of the most convenient size to receive it. The device can be disposed so that a portion of the larger or smaller of the other two apertures, according to the size of the corn, is located over the corn. It will be appreciated that this embodiment of the friction preventer according to the invention is advantageously useful for the protection of corns on any part of the toes, e. g., above or below, or at the sides of the toes, or between them. On many occasions the device may serve for the protection of a plurality of corns on a toe to which it is applied, or, for example, of a corn on the top of one toe and another on the nearer side of an adjacent toe.

It is to be observed that in the embodiment last described, the apertures 8 and 10 are disposed nearer to the lower surface 11, which is parallel to the common plane of their axes, than to the other parallel surface 12, so that the device may be located, when a toe is inserted in either of said apertures, with a greater or less thickness of the resilient material about a corn and between the inserted toe and the shoe or an adjacent toe, as may be desirable for comfort in wear.

In the embodiment shown in Figs. 5 and 6, for the particular protection of hammer toes, the block 13 of spongy or porous rubber is of arched or U-section form, with coaxial apertures 14 in the lateral portions 15, and an aperture 16 disposed radially to the axis of the apertures 14 in the crown or middle portion 17. This device is intended for the insertion of the affected toe through the apertures 14, so that the aperture 16 is located above the joint. The lateral portions 15 press upwardly at each side of the joint, and the crown portion 17 presses downwardly all round the upper surface of the joint, while the latter is itself relieved of pressure by the location of the aperture 16 immediately over it. The major thickness of the block 13 is disposable above the toe to afford adequate protection of the raised joint from contact with the shoe under the usual pressure exerted by the latter. Moreover, the crown 17 has its edges and corners bevelled, as shown, or rounded, to facilitate the drawing of a sock or stocking over it.

Each of the devices described and illustrated is preferably made of sponge rubber of the kind having intercommunicating pores or cells, and without a skin. They may thus be conveniently and cheaply produced as by cutting from blocks of the rubber sponge material. The devices are comfortable and hygienic in wear, their porous nature enabling free ventilation of the affected toes while affording complete protection against friction and pressure. Moreover, they are removable and washable so that they may be repeatedly used, or they may without detriment be left in place during washing or immersion of the feet. When made of spongy rubber of the kind described, the devices have the further advantage that they are gripped by the fibres of a sock or stocking worn over them, so that their maintenance in position is ensured.

Evidently, the forms and materials of the devices may be varied without exceeding the scope of the invention. For example, any of the embodiments as illustrated may be enlarged to comprise a plurality of substantially parallel apertures for the insertion of two or more toes, with further apertures extending radially therefrom in the manner described.

I claim:

1. As an article of manufacture, a friction preventer for the protection of the toes and toe joints, consisting of a block of soft, resilient material having a through aperture for the insertion therein of a toe, and at least one further aperture extending radially from the first mentioned aperture and locatable over an affected part of the toe so that the block bears on the toe around said affected part which is thereby entirely relieved of pressure.

2. As an article of manufacture, a friction preventer for the protection of the toes and toe joints, consisting of a block of soft, resilient material having at least two mutually perpendicular and intersecting through apertures, either of said apertures serving to receive a toe so that at least one end of the other aperture is locatable over an affected part of the toe and the block bears on the toe around said affected part which is thereby entirely relieved of pressure.

3. As an article of manufacture, a friction preventer for the protection of the toes and toe joints, consisting of a block of soft, resilient material having at least two through apertures of greater and less cross-sectional dimensions and extending substantially perpendicularly to one another, either of said apertures serving to receive a toe of corresponding size so that at least one end of the other aperture is locatable over an affected part of the toe and the block bears on the toe around said affected part which is thereby entirely relieved of pressure.

4. As an article of manufacture, a friction preventer for the protection of the toes and toe joints, consisting of a unitary, triangular prismatic block of spongy rubber of the skinless kind having intercommunicating cells, said block having a through aperture extending between two of the mutually inclined sides and substantially parallel to the third of said sides, and said block further having an aperture extending radially from said first mentioned aperture to said third side.

5. As an article of manufacture, a friction preventer for the protection of the toes and toe joints, consisting of a unitary block of spongy rubber of the skinless kind having intercommunicating cells, said block having three mutually perpendicular through apertures and being symmetrical about the axis of any of said apertures.

6. As an article of manufacture, a friction preventer for the protection of hammer toes, consisting of a unitary arched block of spongy rubber of the skinless kind having intercommunicating cells, said block having coaxial apertures extending through its lateral portions for the reception of the toe, and further having an aperture extending through its crown perpendicularly to the axis of said first mentioned apertures to enable said crown to bear on the toe about the affected joint while relieving the joint itself of pressure.

JOHN ALOYSIUS TONER.